United States Patent
Eckermann et al.

(10) Patent No.: US 7,865,897 B2
(45) Date of Patent: Jan. 4, 2011

(54) SELECTIVE TRANSACTION REQUEST PROCESSING AT AN INTERCONNECT DURING A LOCKOUT

(75) Inventors: Benjamin C. Eckermann, Tanunda (AU); Brett W. Murdock, Round Rock, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1096 days.

(21) Appl. No.: 11/347,103

(22) Filed: Feb. 3, 2006

(65) Prior Publication Data

US 2007/0186217 A1 Aug. 9, 2007

(51) Int. Cl.
G06F 9/46 (2006.01)
(52) U.S. Cl. ...................................... 718/104
(58) Field of Classification Search ................ 711/218, 711/130; 718/104; 710/309; 707/8
See application file for complete search history.

(56) References Cited

U.S. PATENT DOCUMENTS

| | | | |
|---|---|---|---|
| 5,559,979 A | 9/1996 | Shiga et al. | |
| 5,913,044 A | 6/1999 | Tran et al. | |
| 6,098,134 A | 8/2000 | Michels | |
| 6,189,007 B1 * | 2/2001 | Boonie et al. | 707/8 |
| 6,323,755 B1 | 11/2001 | Lee et al. | |
| 6,493,784 B1 * | 12/2002 | Kamimura et al. | 710/309 |
| 6,745,273 B1 | 6/2004 | Gehman | |
| 6,775,727 B2 | 8/2004 | Moyer | |
| 6,801,983 B2 | 10/2004 | Abe et al. | |
| 2002/0138677 A1 | 9/2002 | Brock et al. | |
| 2005/0097560 A1 * | 5/2005 | Rolia et al. | 718/104 |

OTHER PUBLICATIONS

International Search Report and Written Opinion for correlating PCT Patent Application No. PCT/US06/62474 dated Jul. 8, 2008.
Supplementary European Search Report mailed on Jul. 26, 2010 for Application EP 06 85 1333 (PCT/2006/062474), 5 pages.

* cited by examiner

Primary Examiner—Li B Zhen
Assistant Examiner—Eric C Wai

(57) ABSTRACT

A method includes receiving, at an interconnect, a first transaction request from a first requesting module. The first transaction request includes a request to utilize at least one system resource accessible via the interconnect. The method further includes determining potential interferences at the interconnect expected to occur as a result of a utilization of the at least one system resource by the first requesting module and initiating processing of the first transaction request at the interconnect. The method additionally includes authorizing processing of a second transaction request from a second requesting module during the processing of the first transaction request based on the determined potential interferences.

20 Claims, 4 Drawing Sheets

| | MASTER N - TID = 0000 LOCK REGISTER | | | | | |
|---|---|---|---|---|---|---|
| BIT | N | ... | 3 | 2 | 1 | 0 |
| NAME | REQUESTOR N | ... | REQUESTOR 3 | REQUESTOR 2 | REQUESTOR 1 | REQUESTOR 0 |
| AUTHORIZATION | RUN (1) | ... | HALT (0) | HALT (0) | HALT (0) | HALT (0) |

| | MASTER N - TID = 1111 LOCK REGISTER | | | | | |
|---|---|---|---|---|---|---|
| BIT | N | ... | 3 | 2 | 1 | 0 |
| NAME | REQUESTOR N | ... | REQUESTOR 3 | REQUESTOR 2 | REQUESTOR 1 | REQUESTOR 0 |
| AUTHORIZATION | RUN (1) | ... | HALT (0) | RUN (1) | HALT (0) | RUN (1) |

*FIG. 2*

| RESOURCE \ REQUESTOR | 0 | 1 | 2 | 3 |
|---|---|---|---|---|
| 0 | 1 | 0 | 0 | 0 |
| 1 | 1 | 1 | 1 | 0 |
| 2 | 1 | 1 | 0 | 1 |
| 3 | 1 | 0 | 0 | 0 |

*FIG. 3*

SELECTIVE TRANSACTION REQUEST PROCESSING AT AN INTERCONNECT DURING A LOCKOUT

FIELD OF THE DISCLOSURE

The present disclosure is related generally to processing resource requests in a processing system and more particularly to authorizing resource requests at an interconnect that connects resource requestors and resources.

BACKGROUND

Highly integrated devices, such as micro controllers, can support multiple high speed processing modules, each of which are capable of requesting large quantities of information. Such devices frequently utilize interconnects, which receive transaction requests from requesting modules and in turn interconnect the requesting module to other system resources identified by the transaction requests. In certain instances, a requesting module may be performing a sensitive operation that requires use of one or more resources without interference by other requesting modules, such as an atomic operation, and therefore may submit a lockout transaction request to the interconnect to lockout other requesting modules. In conventional implementations, the interconnect, upon acceptance of a lockout transaction request, ceases to process transaction requests from all other requesting modules even when the processing of another transaction request would not interfere with the initial lockout transaction. As a result, lockout transaction requests can significantly impede the throughput of transaction requests at an interconnect of a processing device. Further, conventional implementations can result in transaction deadlocks between non-independent requesting modules. An improved technique for processing lockout transaction requests at an interconnect therefore would be advantageous.

BRIEF DESCRIPTION OF THE DRAWINGS

The present disclosure may be better understood, and its numerous features and advantages made apparent to those skilled in the art by referencing the accompanying drawings.

FIGS. 2 and 3 are diagrams illustrating exemplary transaction block registers in accordance with at least one embodiment of the present disclosure.

The use of the same reference symbols in different drawings indicates similar or identical items.

DETAILED DESCRIPTION OF THE DRAWINGS

Figure 1:
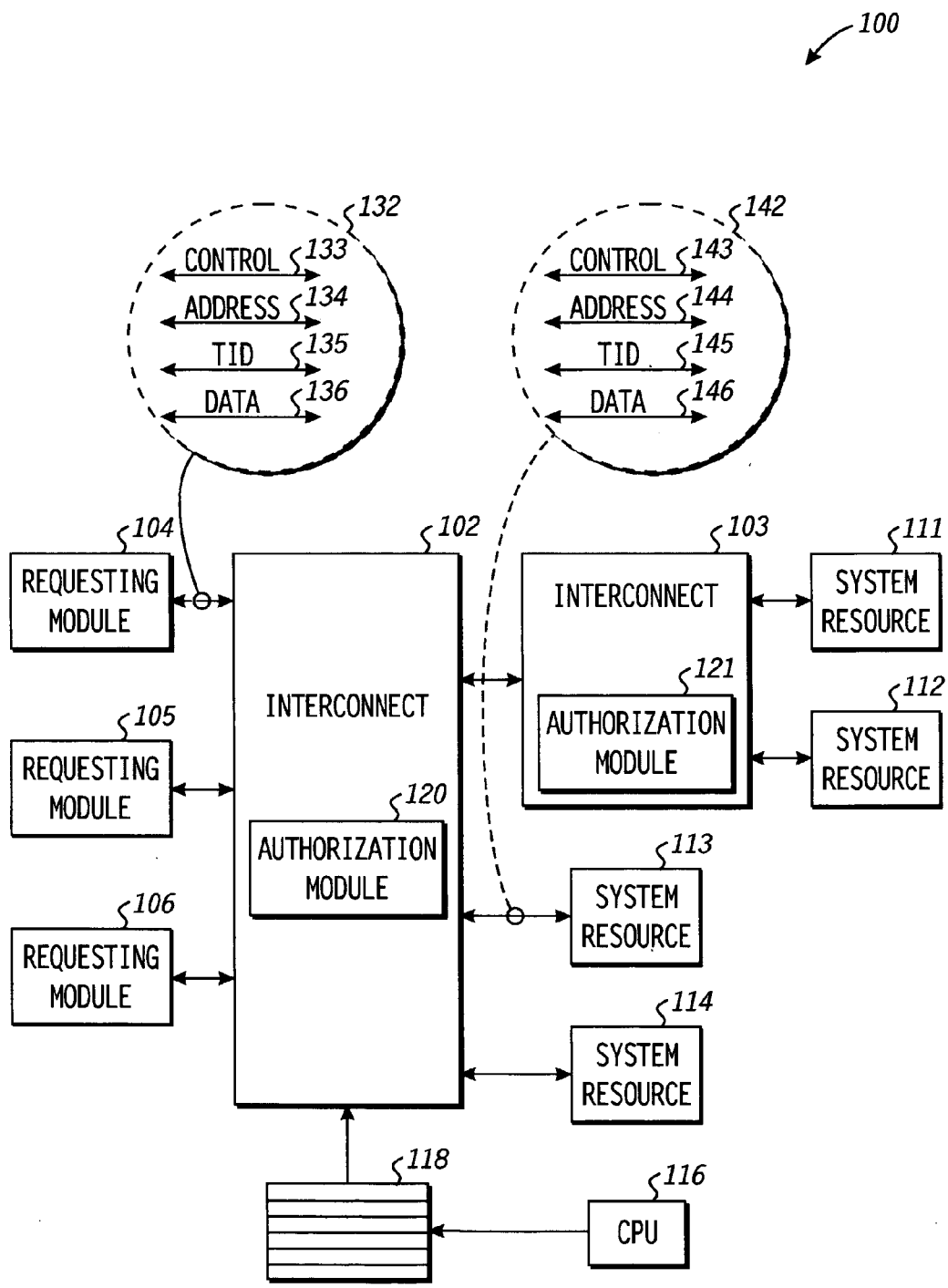
FIG. 1 is a block diagram illustrating an exemplary processing device utilizing selective interconnect transaction request processing in accordance with at least one embodiment of the present disclosure.

In accordance with one aspect of the present disclosure, a method includes receiving, at an interconnect, a first transaction request from a first requesting module. The first transaction request includes a request to utilize at least one system resource accessible via the interconnect. The method further includes determining potential interferences at the interconnect expected to occur as a result of a utilization of the at least one system resource by the first requesting module and initiating processing of the first transaction request at the interconnect. The method additionally includes authorizing processing of a second transaction request from a second requesting module during the processing of the first transaction request based on the determined potential interferences.

In accordance with another aspect of the present disclosure, the method includes initiating, at a first time, processing of a first transaction request from a first requesting module at an interconnect and receiving, at a second time subsequent to the first time, a second transaction request from a second requesting module. The method further includes accessing a table based on transaction information associated with the first transaction request so as to determine whether the second transaction request is permitted to be processed at the interconnect concurrently with the first transaction request. The method additionally includes initiating, at a third time subsequent to the second time, processing of the second transaction request at the interconnect when it is determined that the second transaction request is permitted to be processed concurrently with the first transaction request. The method also includes terminating, at a fourth time subsequent to the third time, the processing of the first transaction request.

In accordance with yet another aspect of the present disclosure, a system includes an interconnect operably coupled to a first requesting module, a second requesting module and a plurality of system resources. The interconnect includes means for receiving a first transaction request from the first requesting module, the first transaction request including a request to utilize at least one system resource of the plurality of system resources, and means for determining potential interferences expected to occur as a result of a utilization of the at least one system resource by the first requesting module. The interconnect further includes means for initiating processing of the first transaction request at the interconnect and means for authorizing processing of a second transaction request from the second requesting module during the processing of the first transaction request based on the determined potential interferences.

FIGS. 1-5 illustrate exemplary techniques for selectively processing transaction requests at an interconnect while the interconnect is in a lockout state for processing a lockout transaction request for a requesting module of a processing device. Upon receipt of the lockout transaction request from a first requesting module, the interconnect identifies one or more other requesting modules that are not expected to issue transaction requests that interfere with the first processing device's transaction via the interconnect. While in the lockout state, the interconnect accepts transaction requests from the identified requesting modules and denies or delays processing of transaction requests from other requesting modules. In one embodiment, the one or more other requesting modules that are not expected to interfere are identified at programming time or compile time and a table or other data structure can be created to identify permitted or prohibited requesting modules for each type of lockout transaction request. In another embodiment, the table or other data structure may be dynamically altered during system operation.

Referring to FIG. 1, an exemplary processing system 100 utilizing selective transaction request processing during an interconnect lockout is illustrated in accordance with at least one embodiment of the present disclosure. The processing system 100 may be implemented as, for example, components formed together on a common integrated circuit (IC)

substrate, such as a system-on-a-chip (SOC), or may implemented as components partitioned between multiple IC substrates.

As depicted, the system 100 includes main interconnect 102, secondary interconnect 103, a plurality of requesting modules (e.g., requesting modules 104-106), a plurality of system resources (e.g., system resources 111-114), a central processing unit (CPU) 116, and a transaction request interferences data store 118. In the illustrated example, the requesting modules 104-106 and the system resources 113 and 114 are connected to main interconnect 102 and the system resources 111 and 112 are connected to the secondary interconnect 103. Further, the main interconnect 102 and the secondary interconnect 103 can include an authorization module 120 and an authorization module 121, respectively. The authorization modules 120 and 121 can be implemented as hardware, such as state machines, static or dynamic logic, as microcode, firmware or other software executed at a processing device, or any combination thereof.

The interconnects 102 and 103 can include any of a variety of connection meshes, such as a cross-point switch, one or more interconnected busses, and the like. Exemplary commercial interconnect specifications that may be employed include the AMBA® 3 AXI (Advanced eXtensible Interface) specification, the AMBA® BusMatrix™ specification, the Open Core Protocol (OCP) specification (also commonly referred to as the Open Core Protocol-International Partnership (OCP-IP) specification), the SMART™ interconnect specification or the SonicsMX™ interconnect specification available from Sonics, Inc. The requesting modules 104-106 (also commonly referred to as "masters") can include any of a variety of components of the system 100 that share system resources. Examples of requesting modules include an instruction fetch unit, a data fetch unit, a direct memory access (DMA) controller, an Ethernet controller, audio/video encoders/decoders, and the like. The system resources 111-114 include one or more components of the system 100 that can be accessed or otherwise utilized by one or more of the requesting modules 104-106. Examples of system resources include embedded memories (e.g., M1 or M2 embedded static random access memories (SRAMS)), a double data rate (DDR) memory interface, a time division multiplexing (TDM) interface, a host interface or other serial peripheral (e.g., an SPI, I2C, or UART interface), a register interface, programming model of a peripheral, and the like. It will be appreciated that a requesting module can also be a system resource, and vice versa.

The requesting modules 104-106 and the system resources 111-114 are connected to one of the interconnects 102 or 103 via a corresponding bus connect. Routing of information between the interconnects 102 and 103 also is achieved via a bus connect. As breakout bubble 132 illustrates, the bus connect connecting a requesting module to an interconnect can be used to transmit control information 133, address information 134, transaction identifier (TID) information 135, and data information 136. Likewise, the breakout bubble 142 illustrates that the bus connect connecting a system resource to an interconnect can be used to transmit control information 143, address information 144, TID information 145, and data information 146.

The interconnect 102 further is connected to the transaction request interferences data store 118, which stores information representative of expected interferences (or the lack of expected interferences) among requesting modules for one or more types of lockout transaction requests that may be submitted by the requesting modules. The interferences data store 118 can be implemented as a table, a matrix, and the like.

To illustrate, in one embodiment, the interferences data store 118 includes a table implemented as a plurality of registers, where each register represents a subset of the entries of the table. Each entry of the table, in turn, corresponds to a particular lockout transaction type (identified by an optional TID associated with the lockout transaction) and stores information that indicates which requesting modules are expected to interfere and which requesting modules are not expected to interfere should the lockout transaction request be implemented at an interconnect. An exemplary format of the entries of the table is described in greater detail with respect to FIGS. 2 and 3.

In one embodiment, each of the requesting modules 104-106 can initiate one or more transaction requests, each of which can include transaction information, such as a transaction identifier (TID) identifying the type of transaction request. The transaction requests are provided to interconnect 102 for processing. The interconnect 102 then provides a corresponding transaction request to one or more of the system resources 111-114 as appropriate. In one embodiment, the transaction identifier received from the requesting module is included as part of the corresponding transaction request to the system resource. In an alternate embodiment, the interconnect 102 provides a different transaction identifier to the system resource and maintains an association between the original transaction identifier received at the interconnect 102 from the requesting module and the transaction identifier provided to the system resource from the interconnect. As the transaction identifier of a lockout transaction request can be used by the interconnect in determining whether to permit or halt the processing of subsequent transaction requests during lockout, the requesting modules 104-106, in one embodiment, determine a transaction identifier to associate with a particular lockout transaction request based on one or more characteristics of the lockout transaction request. These characteristics can include, for example, the transaction type (e.g., read, write, read-modify-write, etc.), the particular system resources utilized by the transaction, the expected length of the transaction, and the like.

When a system resource has processed the corresponding transaction request from the interconnect 102 it can initiate its own transaction request with the interconnect 102, or the interconnect 103, to facilitate the transfer of information (if any) originally requested by the requesting module. As part of its transaction request, the system resource can forward or return the transaction identifier it received from the interconnect 102, so that the interconnect 102 can not only determine which transaction the information being transferred is associated with, but also can determine a relative priority amongst other transaction requests pending for the same requesting device based upon the transaction identifier.

In certain instances, a requesting module may submit a lockout transaction request, thereby notifying the interconnect 102 that it requires unimpeded or uninterrupted use of one or more of the system resources 111-114. To illustrate, the requesting module, or a device associated with the requesting module, may need to perform an atomic operation and therefore needs to ensure that data associated with the atomic operations does not change before the operation is completed. As another example, an operation utilizing one or more of the system resources 111-114 may be high-priority and the system 100 therefore may operate to ensure that its execution is not impeded. Upon receipt of a lockout transaction request, the interconnect 102, in one embodiment, permits any transaction requests presently being processed to complete and then initiates a lockout at the interconnect 102.

In conventional systems, a lockout of the interconnect would prevent any other requestor from utilizing the interconnect. In contrast, in one embodiment, the interconnect 102 permits certain transaction requests to be processed while in a lockout state based on a determination that the transaction requests are not expected to interfere with the original requesting modules lockout transaction. In one embodiment, whether or not a transaction request is expected to interfere may be determined based on the operations of the transaction request itself in relation to the operations of the lockout transaction. To illustrate, the lockout transaction could include a read-modify-write access to a memory (one embodiment of a system resource). In this instance, read accesses to the memory during the read-modify-write access will not interfere with the read-modify-write access, so a transaction request representing a read request to the memory may be accepted for processing during the lockout as it will not interfere with the lockout transaction. Thus, any of a variety of characteristics of a transaction request (e.g., address range, access type, etc.) may be used to determine any expected interferences.

In another embodiment, whether or not a transaction is expected to interfere with a lockout transaction may be determined based on the source requesting module of the lockout transaction and the source requesting module of the transaction request. To illustrate, in certain instances it may be predetermined that one or more requesting modules will not attempt to access the system resources expected to be accessed by a certain requesting module. Accordingly, when the certain requesting module initiates a lockout transaction, the interconnect may continue to accept transaction requests from the other one or more requesting modules due to their known non-interference. In another embodiment, expected interferences between a lockout transaction and other transaction requests can be predetermined or updated dynamically on a transaction-by-transaction basis.

In one embodiment, the interconnect 102 utilizes the authorization module 120 to authorize or deny transaction requests while in a lockout state. The authorization module 120 access the interferences data store 118 to determine those requesting modules that are expected to interfere with the lockout transaction and those requesting modules that are not expected to interfere with the lockout transaction.

Upon entering a lockout state in response to a received lockout transaction request, the authorization module 120 accesses the interferences data store 118 to identify those requesting modules that are permitted to have their transaction requests processed, and those requesting modules that are denied processing of their transaction requests, during the lockout state. In one embodiment, the interferences data store 118 includes a plurality of entries, each entry indexed to a particular transaction identifier. Accordingly, the authorization module 120 may utilize the transaction identifier to access the corresponding entry. The accessed entry can contain information identifying which of the requesting modules 104-106 are permitted to have transaction requests processed or are denied processing of their transaction requests, during a lockout resulting from the processing of a transaction request having the corresponding transaction identifier. As noted above, whether a requesting module is permitted or denied processing of its transaction requests during a lockout of the interconnect 102, in one embodiment, is based on whether the requesting module's transaction requests are expected to interfere with the processing of the lockout transaction. The expectation of interference can be based on the characteristics of the transaction request, based on the identity of the requesting module submitting the transaction request, and the like.

Upon receipt of a transaction request from a requesting module, the authorization module 120 identifies the requesting module and determines whether the identifier processing module is authorized based on the interferences information obtained from the interferences data store 118. If authorized, the authorization module 120 may direct the interconnect 102 to initiate processing of the received transaction request. Otherwise, if not authorized, the authorization module 120 may deny the received transaction request or may store the received transaction request for processing once the interconnect 102 has exited the lockout state. In one embodiment, a retry indicator is provided so that the denied transaction requests are re-requested at a future point in time by the originating requesting modules. Further, in one embodiment, the authorization module 120 may signal to the requesting modules 104-106 whether they are authorized or not during the lockout state so that unauthorized requesting modules can avoid transmitting transaction requests that will not be processed by the interconnect 102 while in the lockout state. In one embodiment, the authorization module 121 operates in the same manner as the authorization module 120 to control the processing of transaction requests while the interconnect 103 is in a lockout state.

Referring to FIG. 2, an exemplary format for entries of the interferences data store 118 of FIG. 1 is illustrated in accordance with at least one embodiment of the present disclosure. FIG. 2 illustrates an exemplary entry 200 associated with a transaction identifier 0000 and an exemplary entry 202 associated with a transaction identifier 1111. In at least one embodiment, the entries 200 and 202 each are implemented as at least a portion of a register.

As illustrated, each of the entries 200, 202 include N bit positions, each bit position associated with a corresponding one of N requesting modules. At each bit position, a bit value of one (1) or (0) is stored to indicate whether the transaction requests from the corresponding requesting module is authorized or denied, respectively. By default, the requesting module associated with the transaction identifier is assigned a bit value of one (1) at its associated bit position as it is the requesting module that requests the transaction. In the entries 200 and 202 illustrated by FIG. 2, the requesting module associated with the lockout transaction request with the transaction identifiers of 0000 and 1111, respectively, is requesting module N, so a bit value of one (1) is stored at the Nth bit position. As illustrated by entry 200, when a lockout transaction request having a transaction identifier 0000 is initiated, no other requesting module is permitted to have its transaction requests processed at the interconnect 102 (FIG. 1) while in the lockout state, as indicated by the bit values of zero (0) stored in the 0 to N−1 bit positions. As illustrated by entry 202, when a lockout transaction request having a transaction identifier 1111 is received, only the requesting modules 0 and 2 are permitted to have their transaction requests processed while the interconnect 102 is in the lockout state, as indicated by the bit value of one (1) stored in the 0 and 2 bit positions and the bit value of zero (0) stored in the remaining bit positions.

As described above, the values at the bit positions of the entries 200 and 202 may be predetermined and set by an application or configuration routine executed by, for example, the CPU 116 (FIG. 1), or expected interferences between transaction requests may be determined based on a historical analysis and the bit positions set of the entries set accordingly.

Referring to FIG. 3, another exemplary format for the entries of the interferences data store 118 of FIG. 1 is illustrated in accordance with at least one embodiment of the present disclosure. In addition to, or instead of, permitting or denying transaction requests in a lockout state based solely on the source requesting module, in at least one embodiment, the interconnect can determine whether to permit or deny a transaction request based on the system resources it is expected to utilize. Accordingly, the interferences data store 118 can include a requestor-resources interferences table represented by one or more matrices 300 having a plurality of columns, each corresponding to a particular requesting module, and a plurality of row, each corresponding to a particular system resource. The value at each row-column position of the matrix 300 indicates whether a transaction request from the requesting module corresponding to the identified column that is to access the system resource corresponding to the identified column is permitted or denied during a lockout state at the interconnect. In the illustrated example, a value of one (1) indicates that the corresponding transaction request is permitted to be processed during a lockout state of the interconnect and a value of zero (0) indicates that the transaction request is denied processing. In the event that a transaction request utilizes more than one system resource, the matrix 30 should have a value of one for each system resource expected to be used by the transaction request. To illustrate, a transaction request from requesting module 1 that is expected to utilize only the system resource 2 is permitted because there is a value of one at the (2,1) position of the matrix 300. In contrast, a transaction request from requesting module 1 that is expected to utilize both system resource 2 and system resource 3 is denied because there is a value of zero at the (3,1) position, even though there is a one at the (2,1) position.

Although FIGS. 2 and 3 illustrate exemplary table entry formats, those skilled in the art may implement other formats using the guidelines provided herein without departing from the scope of the present disclosure. To illustrate, each table entry may identify other transaction identifiers that are permitted or denied. Alternately, each table entry may identify the system resources to be utilized during the transaction, as well as the type of access (e.g., read or write), so that when another transaction request is received, the interconnect can determine whether the lockout transaction and the requested transaction may access the same system resource and therefore may interfere with each other. As another example, the table entries may identify those particular requesting modules that are permitted to have transaction requests processed and those that are to have their transaction requests denied or delayed when a corresponding requesting module has implemented a lockout transaction.

Figure 4:
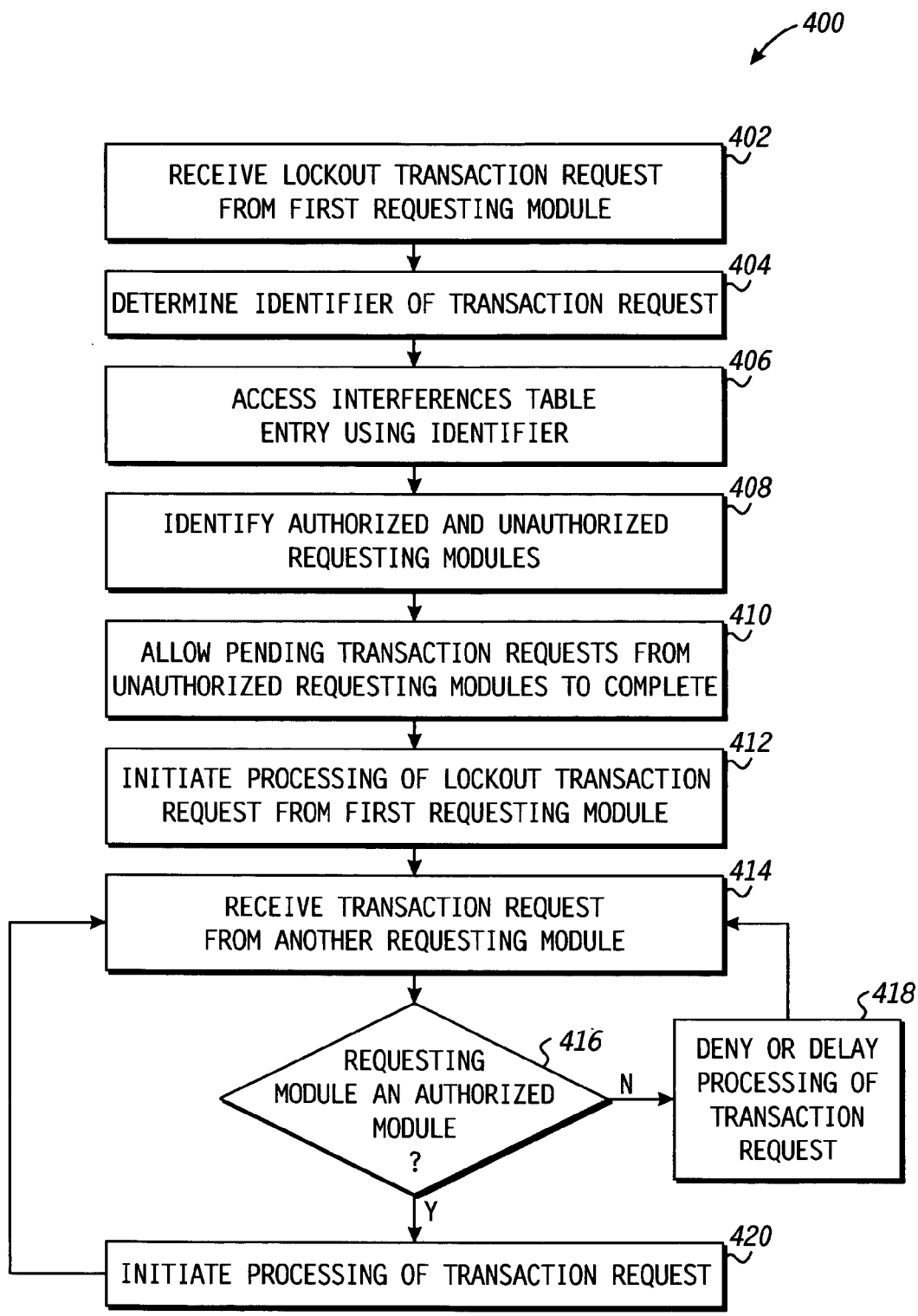
FIG. 4 is a flow diagram illustrating an exemplary method of selectively processing transaction requests during a lockout of a interconnect in accordance with at least one embodiment of the present disclosure.

Referring to FIG. 4, an exemplary method 400 to selectively process transaction requests during a lockout of an interconnect is illustrated in accordance with at least one embodiment of the present disclosure. At block 402, the method 400 includes receiving a lockout transaction request from a first requesting module at an interconnect of a processing system. In at least one embodiment, the lockout transaction request includes a transaction identifier, control information, data, and the like. At block 404, the interconnect determines the transaction identifier (TID) or other identifier (e.g., requesting module identifier) associated with the lockout transaction request and at block 406 the interconnect accesses the entry of an interferences table corresponding to the determined identifier. As noted above, the interferences table may be implemented as a plurality of registers or other storage locations that are indexed based on identifiers.

At block 408, the interconnect identifies authorized requesting modules (if any) and unauthorized requesting modules (if any) using the information stored at the table entry accessed at block 406. As described above, the information stored at each table entry can indicate whether a transaction request from a particular requesting module is expected to interfere with a lockout of the interconnect resulting from the processing of the lockout transaction request having the corresponding identifier.

At block 410, the interconnect permits any pending transaction requests from unauthorized requesting modules to complete, and at block 412 the interconnect initiates processing of the lockout transaction request, thereby placing the interconnect in a lockout state.

At block 414, a transaction request from another requesting module is received at the interconnect while it is in the lockout state. At block 416, the interconnect determines whether the requesting module that issued the transaction request is an authorized requesting module as identified at block 408. If the requesting module is not authorized, at block 418 the interconnect denies or delays processing of the transaction request. The interconnect then may store the transaction request for processing after completing the lockout transaction request, or the interconnect simply may drop the transaction request. In one embodiment, the interconnect may signal via a retry indicator to the denied requesting module that the request should be regenerated at a subsequent time. If the requesting module is authorized, at block 420 the interconnect initiates the processing of the received transaction request. The flow of method 400 then returns to step 414 when another transaction request is received or terminates at the completion of the lockout transaction request.

Figure 5:
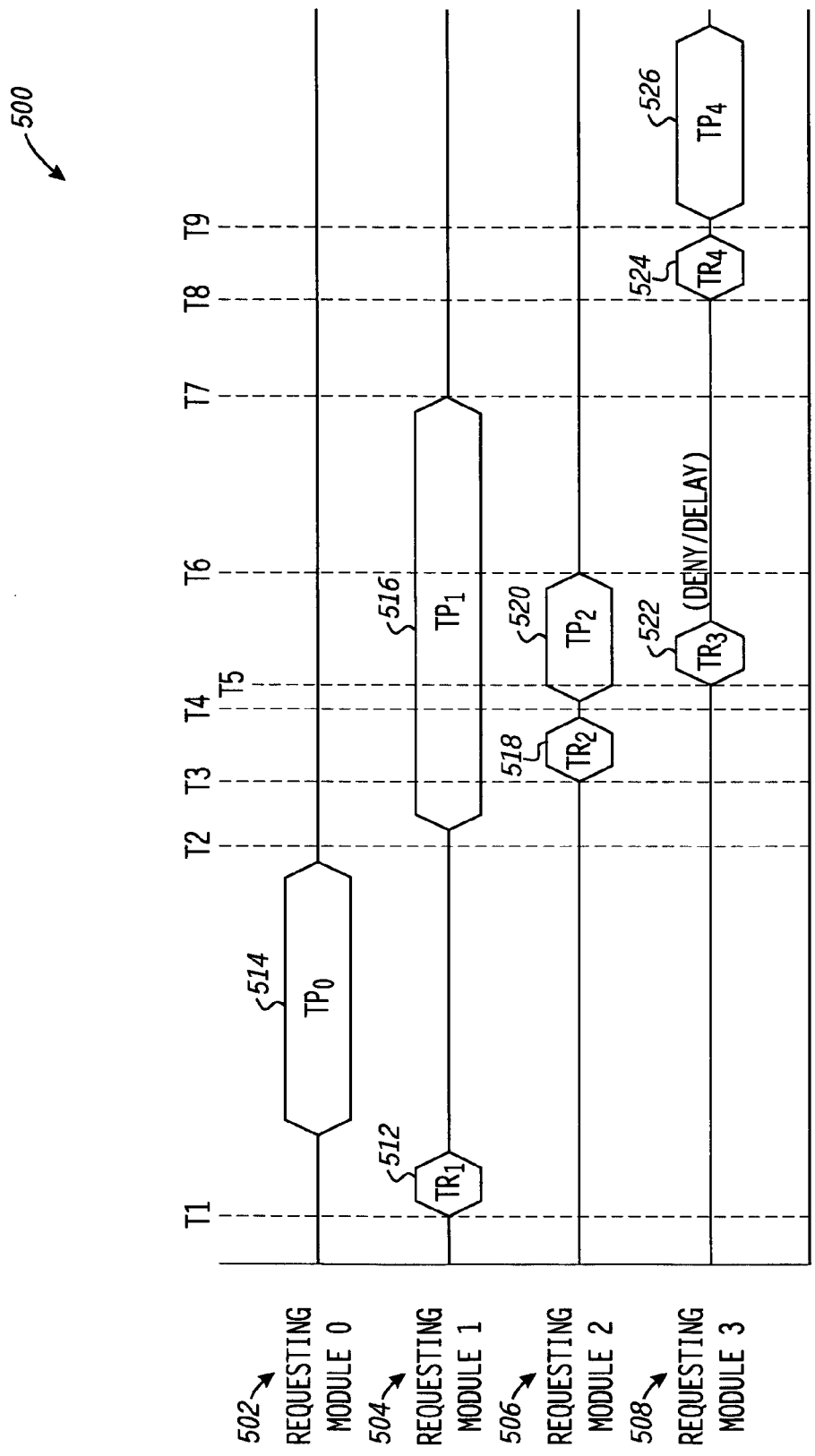
FIG. 5 is a timing diagram illustrating an exemplary processing of transaction requests at an interconnect in accordance with at least one embodiment of the present disclosure.

Referring to FIG. 5, a timing diagram 500 illustrating selective processing of transaction requests at an interconnect is illustrated in accordance with at least one embodiment of the present disclosure. Lines 502, 504, 506 and 508 correspond to transaction request activity from requesting modules 0, 1, 2 and 3, respectively.

At time $t_1$, the requesting module 1 submits a lockout transaction request ($TR_1$ 512) to the interconnect. At this time, the interconnect has a transaction request from requesting module 0 already in process (identified as $TP_0$ 514), so the interconnect permits the processing to continue until it completes at time $t_2$, at which time the interconnect initiates processing of the lockout transaction request (identified at $TP_1$ 516). Processing of the lockout transaction request concludes at time $t_7$. Further, the interconnect determines which of the requesting modules 0, 2 and 3 are authorized to have their transaction requests processed while the interconnect is in a lockout state for the processing of the lockout transaction request. For purposes of illustration, it is assumed in the depicted example that requesting module 2 is authorized and requesting modules 0 and 3 are not authorized.

At time $t_3$, a transaction request ($TR_2$ 518) is received from requesting module 2. Because transaction requests from the requesting module are authorized to be processed concurrent with the processing of the lockout transaction request ($TP_1$ 516), the interconnect accepts and initiates the processing of the transaction request $TR_2$ 518 at time $t_4$ (identified as $TP_2$ 520). Processing of the transaction request $TR_2$ 518 ends at time $t_6$.

At time $t_5$, the interconnect receives a transaction request ($TR_3$ 522) from requesting module 3. Because requesting module 3 is not authorized to have its transaction requests processed concurrently with the lockout transaction request ($TP_1$ 516), the interconnect denies processing of the transaction request $TR_3$ 522. Accordingly, after the processing of the lockout transaction request concludes (at time T7), the requesting module 3 resubmits the transaction request as transaction request $TR_4$ 524 at time $t_8$. Because the interconnect is not in a lockout state at time t8, the interconnect accepts and initiates processing of the transaction request TR4 524 at time $t_9$ (indicated as $TP_4$ 526).

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
receiving, at an interconnect of an integrated circuit device, a first transaction request from a first requesting module of the integrated circuit device, the first transaction request including a request to utilize at least one resource accessible via the interconnect;
accessing, at the interconnect, an entry of an interferences table associated with the first transaction request to determine potential interferences expected to occur as a result of a utilization of the at least one resource by the first requesting module, the entry including data indicating that transaction requests from a first set of one or more identified requesting modules are not expected to interfere with the utilization of the at least one resource by the first requesting module;
initiating processing of the first transaction request at the interconnect; and
authorizing processing of a second transaction request from a second requesting module of the integrated circuit device during the processing of the first transaction request responsive to determining the second requesting module is represented in the first set.

2. The method of claim 1, wherein the request to utilize at least one resource comprises a lockout request.

3. The method of claim 2, wherein the entry of the interferences table is identified based on a transaction identifier associated with the first transaction request.

4. The method of claim 1, wherein the entry comprises a plurality of bit positions, each bit position associated with a corresponding one of a plurality of requesting modules and having one of a first value or a second value, the first value indicating that the corresponding requesting module is expected to interfere with the utilization of the at least one resource by the first requesting module and the second value indicating the corresponding requesting module is not expected to interfere with the utilization of the at least one resource by the first requesting module.

5. The method of claim 4, wherein the request to utilize at least one resource comprises a lockout request.

6. The method of claim 1, wherein the entry further includes data indicating that transaction requests from a second set of one or more identified requesting modules are expected to interfere with the utilization of the at least one resource by the first requesting module.

7. The method of claim 6, wherein:
processing of the second transaction request is authorized when the first set includes the second requesting module; and
processing of the second transaction request is denied when the second set includes the second requesting module.

8. The method of claim 1, wherein the entry of the interferences table is identified based on a transaction identifier associated with the first transaction request.

9. The method of claim 1, wherein:
processing of the second transaction request is authorized when the second transaction request is not expected to interfere with the utilization of the at least one resource by the first requesting module; and
processing of the second transaction request is denied when the second transaction request is expected to interfere with the utilization of the at least one resource by the first requesting module.

10. A method comprising:
initiating, at a first time, processing of a first transaction request from a first requesting module of an integrated circuit device at an interconnect of the integrated circuit device;
receiving, at a second time subsequent to the first time, a second transaction request from a second requesting module of the integrated circuit device;
accessing, at the interconnect, an entry of a table based on transaction information associated with the first transaction request so as to determine whether the second transaction request is permitted to be processed at the interconnect concurrently with the first transaction request, the entry including data indicating that transaction requests from a first set of one or more identified requesting modules are not expected to interfere with the utilization of the at least one resource by the first requesting module and data indicating that transaction requests from a second set of one or more identified requesting modules are expected to interfere with the utilization of the at least one resource by the first requesting module;
initiating, at a third time subsequent to the second time, processing of the second transaction request at the interconnect when it is determined that the second transaction request is permitted to be processed concurrently with the first transaction request; and
terminating, at a fourth time subsequent to the third time, the processing of the first transaction request.

11. The method of claim 10, wherein:
accessing the table based on the transaction identifier so as to determine whether the second transaction request is permitted to be processed includes determining whether the second requesting module is represented in the first set or represented in the second set.

12. The method of claim 11, wherein:
processing of the second transaction request is initiated at the interconnect when the second requesting module is represented in the first set; and
processing of the second transaction request is denied at the interconnect when the second requesting module is represented in the second set.

13. The method of claim 11, further comprising:
denying processing of the second transaction request at the interconnect when it is determined that the second transaction request is not permitted to be processed concurrently with the first transaction request.

14. The method of claim 10, further comprising:
denying processing of the second transaction request at the interconnect when it is determined that the second transaction request is not permitted to be processed concurrently with the first transaction request.

15. The method of claim 14, wherein:
accessing the table based on the transaction identifier so as to determine whether the second transaction request is permitted to be processed includes determining whether the second requesting module is represented in the first set or represented in the second set.

16. The method of claim 10, further comprising:
receiving, at a fifth time subsequent to the first time and prior to the third time, a third transaction request from a third requesting module of the integrated circuit device;
determining whether the third transaction request is permitted to be processed at the interconnect concurrently with the first transaction request based on the access of the table; and
initiating, at a sixth time subsequent to the fifth time and prior to the fourth time, processing of the third transaction request at the interconnect when it is determined that the third transaction request is permitted to be processed concurrently with the first transaction request.

17. The method of claim 10, wherein the first transaction request comprises a lockout request.

18. An integrated circuit device comprising:
an inferences table;
an interconnect operably coupled to a first requesting module, a second requesting module and a plurality of resources, the interconnect comprising:
means for receiving a first transaction request from the first requesting module, the first transaction request including a request to utilize at least one resource of the plurality of resources;
means for accessing an entry of the interferences table to determine potential interferences expected to occur as a result of a utilization of the at least one resource by the first requesting module, the entry comprising data indicating that transaction requests from a first set of one or more identified requesting modules are not expected to interfere with the utilization of the at least one resource by the first requesting module and data indicating that transaction requests from a second set of one or more identified requesting modules are expected to interfere with the utilization of the at least one resource by the first requesting module;
means for initiating processing of the first transaction request at the interconnect; and
means for authorizing processing of a second transaction request from the second requesting module during the processing of the first transaction request responsive to determining the second requesting module is represented in the first set.

19. The integrated circuit device of claim 18, wherein the entry comprises a plurality of bit positions, each bit position associated with a corresponding one of a plurality of requesting modules and having one of a first value or a second value, the first value indicating that the corresponding requesting module is expected to interfere with the utilization of the at least one resource by the first requesting module and the second value indicating the corresponding requesting module is not expected to interfere with the utilization of the at least one resource by the first requesting module.

20. The integrated circuit device of claim 18, wherein:
the interconnect authorizes processing of the second transaction request when the second transaction request is not expected to interfere with the utilization of the at least one resource by the first requesting module; and
the interconnect denies processing of the second transaction request when the second transaction request is expected to interfere with the utilization of the at least one resource by the first requesting module.

* * * * *